No. 728,540. PATENTED MAY 19, 1903.
F. E. CASE.
MOTOR CONTROL SYSTEM.
APPLICATION FILED JAN. 6, 1902.
NO MODEL. 3 SHEETS—SHEET 1.
Fig. 1.
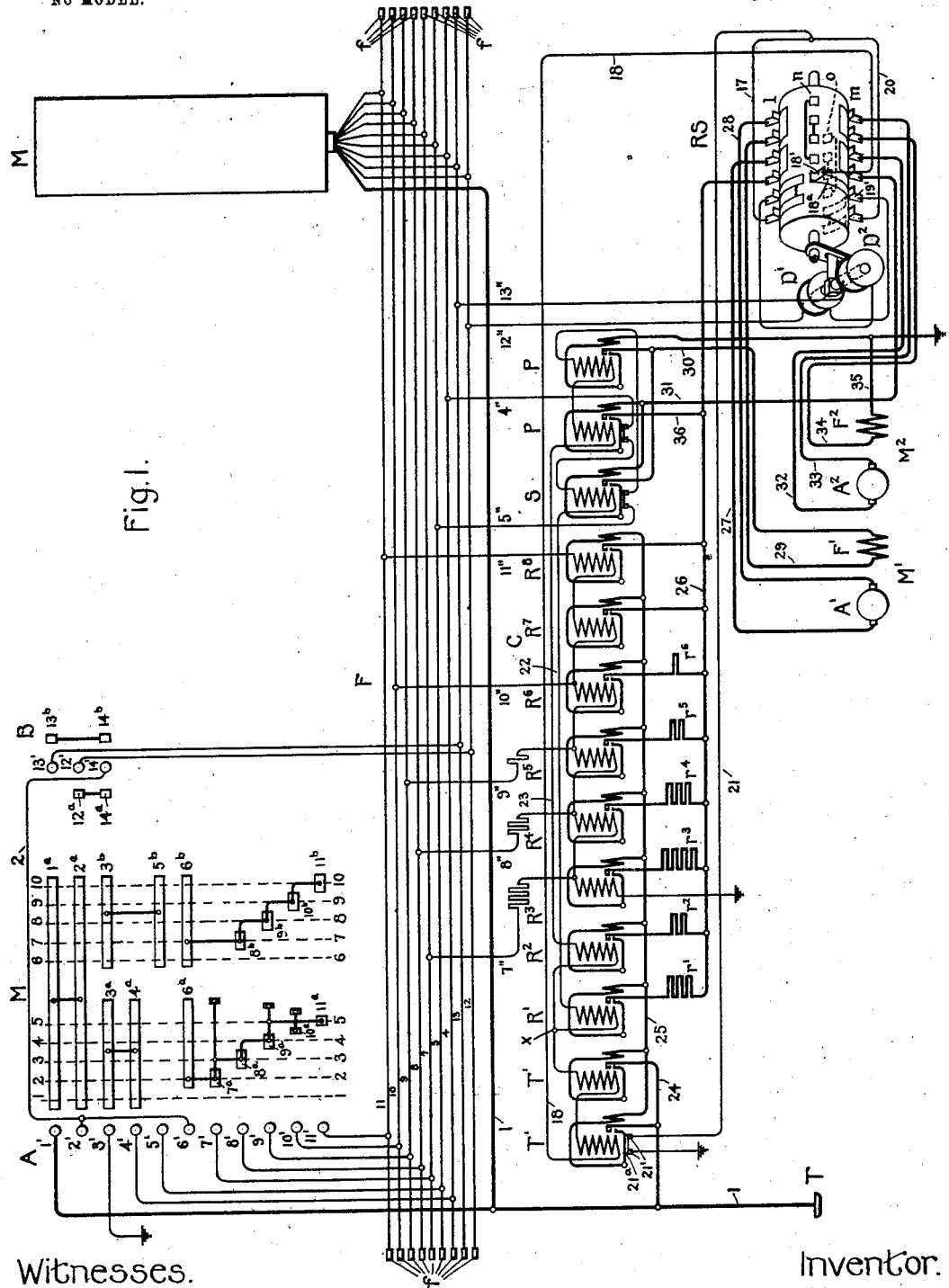
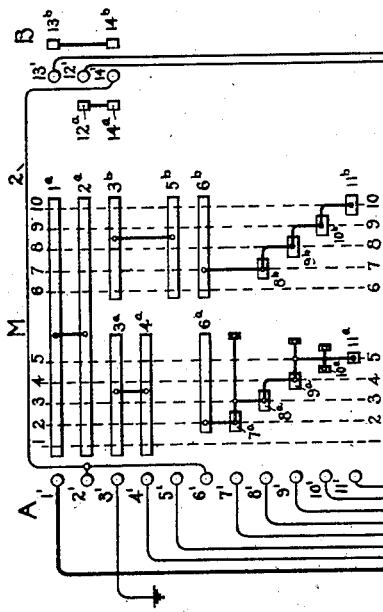
Witnesses.
J. Ellis Glenn.
Benjamin B. Hull.
Inventor.
Frank E. Case.
by Albert _____
Atty.

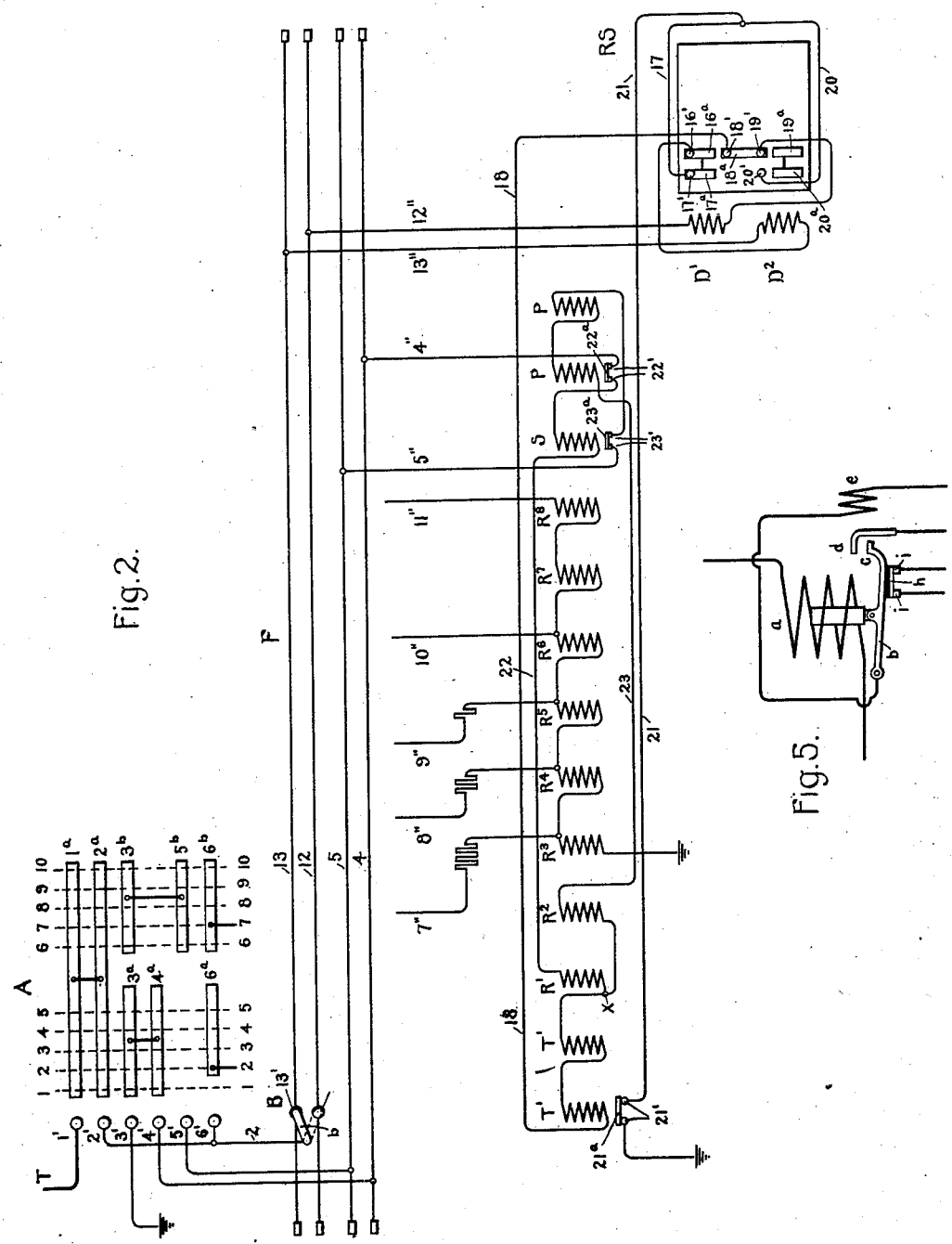

No. 728,540. PATENTED MAY 19, 1903.
F. E. CASE.
MOTOR CONTROL SYSTEM.
APPLICATION FILED JAN. 6, 1902.
NO MODEL. 3 SHEETS—SHEET 3.
Fig. 4.
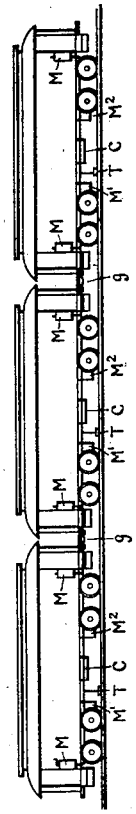
Fig. 3.
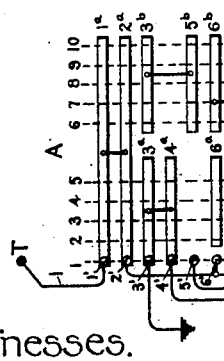
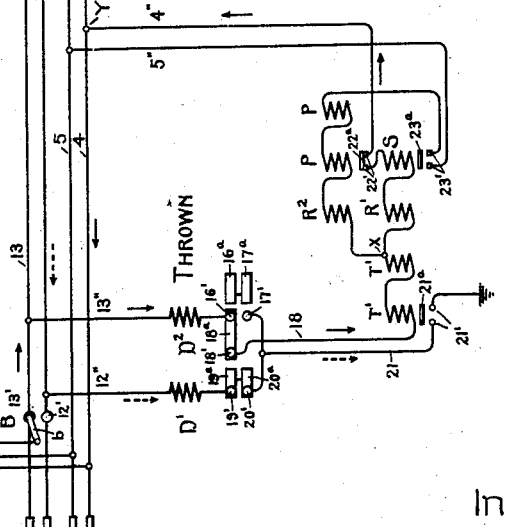
Witnesses.
Inventor.
Frank E. Case.
by Albert G. Davis
Atty.

No. 728,540. Patented May 19, 1903.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 728,540, dated May 19, 1903.

Application filed January 6, 1902. Serial No. 88,522. (No model.)

*To all whom it may concern:*

Be it known that I, FRANK E. CASE, a citizen of the United States, residing at Schenectady, county of Schenectady, State of New York, have invented certain new and useful Improvements in Motor-Control Systems, of which the following is a specification.

My invention relates to electromagnetic control systems for controlling the operation of a plurality of motor-controllers from a single controlling device or master-controller located at any desired point, and has for its object to so organize such a system that improper operation of the motor-controlling switches or contacts will be rendered impossible.

The system to which my invention relates comprises two or more controllers each having a plurality of sets of contacts, together with a suitable operating system for securing the operation of the contacts in the desired order and with means in each controller for preventing the operation of the contacts of one set until after the contacts of the other set have been operated. In the particular organization which I have illustrated in the present application the controller-contacts of one set constitute a circuit-controlling switch of the separately-actuated contact type, such as is disclosed in patent to Thomson, No. 617,546, granted January 10, 1899, and the contacts of the other set are mounted on a suitable support and together constitute a separate direction controlling or reversing switch. The operating system for the controllers comprises electromagnets for controlling the operation of the circuit controlling and reversing contacts, suitable circuits, including the windings of the controlling-electromagnets of the several controllers, and a master-controller or master-controllers located at any desired point or points and arranged to supply current from a suitable source to the circuits to which the electromagnet-windings are connected, so as to actuate the switches of the controller in the proper order.

Systems of the general character above described are now largely used for controlling the operation of propelling-motors on a plurality of cars in an electrically-operated train from a master-controller located at any desired point on the train, and the feature constituting my present invention is especially valuable in connection with railway systems in which all of the propelling-motors are connected to a common load.

The particular system of circuit connections which I have illustrated in the present application for connecting the actuating-windings of the controller-switches to the master-controller differs from that disclosed in the patent to Thomson above referred to and represents the results of a practical development of such a system to meet the requirements which have arisen in actual railway-service. The connections of the actuating-windings of the circuit-controlling switches of the motor-controller are in general the same as in patent to C. L. Perry, No. 687,060, granted November 19, 1901, and reference to this patent may be made for a full and complete description of these connections. The particular organization of the control system as shown herein is, however, a result of further improvements, certain of which are covered in an application filed by W. O. Mundy, Serial No. 88,069, filed January 2, 1902. My present invention consists in adding to the system thus improved certain safety devices which compel the various switches of the motor-controller to operate in a predetermined manner if they operate at all.

My invention will be better understood by reference to the following description, taken in connection with the accompanying drawings, in which—

Figure 1 is a general diagram of a motor-control system embodying the improvements constituting my present invention, the system being shown in a form adapted for application to one of the motor-cars in a train system. Fig. 2 is a simplified diagram of the system shown in Fig. 1, with certain parts omitted in order to more clearly show the features constituting my present invention. Fig. 3 is a similar simplified diagram of parts of the control system suitable for two of the motor-cars of a train or for two motor equipments, showing the conditions which may occur in the operation of the system and the application of my invention thereto. Fig. 4 shows an application of the motor-control system to a train of cars, and Fig. 5 is a diagram illustrating the construction of the controller-switches.

As already stated above, my present invention consists in adding to a system of the character hereinafter described certain safety devices which will prevent the various switches of the motor-controller from operating except in a predetermined manner; but in order that my invention may be understood it will be necessary to first describe the general organization and operation of the entire system.

Referring first to Fig. 1 of the drawings, $M'$ and $M^2$ represent the two motors of a motor equipment; C and RS, the circuit controlling and reversing switches, respectively, of a motor-controller; F, a system of conductors through which the circuits of the actuating-windings for the several controller-switches are completed, and M M two master-controllers, the contacts of which are connected, on the one hand, to the system of conductors F and, on the other, to a suitable source of current. The system as shown in this figure of the drawings comprises such parts as are applicable to one of the motor-cars in a train system, and the system of conductors F is provided at each end with coupling devices $f$, by means of which connections may be completed between corresponding conductors on the several cars of the train. The master-controllers M are located one at each end of the system of conductors F, and this is the arrangement which is generally employed in railway systems in which it is desirable to have a master-controller at each end of each car. The master-controller at the right in Fig. 1 is shown in outline merely; but the corresponding controller at the left is shown diagrammatically, with its fixed and movable contacts developed on a plane surface, as is customary in illustrating such constructions. Each of these master-controllers comprises a controlling-switch A and a reversing-switch B, the two switches being preferably interlocked to prevent either one from being operated unless the other is in proper position. The general construction of the master-controller is the same as that commonly employed for the motor-controllers in street-railway systems, the movable contacts (represented by rectangles in the several figures of the drawings) of the two switches A and B being preferably mounted on cylinders and arranged to be rotated, so as to engage with the fixed contacts (represented by small circles) along the lines 1 1, 2 2, &c., as the operating-handle of the master-controller is turned.

The motor-controller is a controller of the separately-actuated contact type and comprises electromagnetically-actuated circuit-controlling switches $T'$ $T'$ S P P and $R'$ to $R^8$, inclusive, and an electromagnetically-actuated reversing-switch, which, as shown in the drawings, consists of a rotatable cylinder, on which the contacts for connecting the motor-windings for either direction of rotation are mounted, and two electromagnets $D'$ and $D^2$, by means of which the reversing-switch cylinder is moved into one or the other of its operative positions. The construction of the several controlling-switches is indicated by a conventional diagram in Fig. 1, and a similar diagram, on a larger scale and somewhat more complete, is shown in Fig. 5 of the drawings. From this diagram it will be seen that each of the controlling-switches comprises a fixed contact $d$ and a movable contact $c$, mounted on the pivoted member $b$, which is operatively connected to the core of a solenoid $a$. The solenoid of each of the controlling-switches is connected through the conductors F of the control system and that one of the master-controllers from which the system is for the time being controlled to a suitable source of supply, and the motor-circuits are closed through the contacts $c$ and $d$ of the several controller-switches, a blow-out winding $e$ being provided adjacent to the switch-contacts, so as to effectively disrupt any arc which may be formed upon the opening of the circuit through the same. Certain of the controlling-switches are also provided with auxiliary switches, arranged to close certain circuits whenever the said controlling-switches are in their open positions. These auxiliary switches comprise two fixed contacts, which I have indicated by the letters $i$ $i$ in Fig. 5, and a movable contact $h$, carried by the pivoted member $b$ and insulated therefrom. The movable contact operates to close the circuit from one of the fixed contacts to the other when the controlling-switch on which it is mounted is in its open-circuit position.

In order that the operation of the control system may be understood in a general way, let it be supposed that the movable member of the reversing-switch B in Fig. 1 is moved to the right until its contacts $12^a$ and $14^a$ are in engagement with the corresponding fixed contacts $12'$ and $14'$. If now the movable member of the controlling-switch A is moved into its first operative position, in which the fixed contacts $1'$ to $11'$, inclusive, are in engagement with the movable contacts along the line 1 1, a circuit may be traced from the trolley-conductor T through conductor 1 to fixed contact $1'$ of the master-controller, thence through movable contacts $1^a$ and $2^a$ to fixed contact $2'$, through conductor 2 to fixed contact $14'$ of the master reversing-switch, and through cross-connected movable contacts $12^a$ and $14^a$ and the fixed contact $12'$ to conductor 12 of the system of conductors F. If the motor-reversing switches RS of the several motor-cars on the train occupy the position indicated in Fig. 1 of the drawings, a circuit may be traced on each of these cars from the conductor 12 through conductor $12''$ and the actuating-winding of the reversing-switch-actuating magnet $D'$ and through two fixed contacts $18'$ and $19'$, which are in engagement with an auxiliary contact 18ª on the reversing-switch cylinder (the arrangement of these auxiliary contacts may be better understood from an inspection of Fig 2 of the drawings, in which figure they are shown developed on a plane surface) to conductor 18, which is connected to one end of the actuating-winding of one of the circuit-controlling switches T'. From this point the circuit leads through the actuating-windings of the two switches T' T' to a point $x$, where the circuit divides into two branches. One of these branches, however, is open-circuited at the master-controller contacts, and the only circuit which is completed from this point to the other side of the supply-circuit leads through the actuating-winding of the switch R' to conductor 22, thence to the actuating-winding of the switch S, and thence through certain auxiliary contacts controlled by the movable member of one of the switches P and through conductor 4'' to conductor 4 of the system of conductors F. From this conductor the circuit may be traced through fixed contacts 4' and 3' and the coöperating movable contacts 4ª and 3ª of the master-controller to a ground connection. In this first position of the master controlling-switch, therefore, the circuit-controlling switches T', T', R', and S are actuated, and these switches operate to close a circuit for the propelling-motors M' M² through conductor 24, the contacts of the two switches T' T', conductor 25, the contacts of the switch R', the resistance-section $r'$, conductor 26, to the contacts of the range $l$ on the reversing-switch cylinder, thence through the armature-winding A' and the field-winding F' of the motor M' to conductor 30, through the switch-contacts of the switch S to conductor 31, and thence through the contacts of the range $m$ on the reversing-switch cylinder to the armature A² and the field-winding F² of the motor M², and thence to ground. The propelling-motors will thus be connected in series with one another with a maximum resistance $r'$ included in circuit therewith. Further movement of the master controlling-switch A through its succeeding positions 2 2 to 5 5, inclusive, will operate to reduce the resistance in circuit with the propelling-motors by inserting the resistance-sections $r^3$ to $r^6$, inclusive, in parallel with the resistance $r'$ and by finally short-circuiting all resistances. The circuit connections in the control system by means of which these operations are carried out have nothing to do with my present invention, and therefore need not be described. They are similar, however, to the connections in the Perry patent above referred to, and reference may be made to this patent for a full and complete description of these particular connections. When the master-controlling switch is moved into the position into which the contacts 1' to 11', inclusive, lie along the line 6 6, the circuit to ground through contacts 4' and 3' is broken and another circuit to ground is completed from the conductor 5 of the system of conductors F through contacts 5' and 3' and the coöperating movable contacts 5ᵇ and 3ᵇ. When the master controlling-switch is in this position, the circuit for the actuating-windings of the circuit-controlling switches may be traced as before up to the point $x$, where the controlling-circuit branches. From this point the circuit will now lead through the actuating-winding of the switch R² to conductor 23, and thence through the actuating-windings of the switches P P and through certain auxiliary contacts controlled by the switch member of the switch S to conductor 5'', which is connected to conductor 5 of the system of conductors, and thence through the contacts 5' and 3' and coöperating movable contacts of the master controlling-switch to ground. In this position of the master controlling-switch the two trolley-switches T' T', the resistance-switch R², and the two parallel switches P P will be actuated. If we now trace the motor-circuit again, it will be found that the circuit leads through conductor 24 and through the contacts of the two switches T' T', as before, to conductor 25, but in the circuit will lead through contacts of the switch R² to a smaller resistance of higher carrying capacity $r^2$, and thence to conductor 26. The circuit through the windings of the motor M' will be as before; but the circuit from the conductor 30 will now be completed through the contacts of the last switch P directly to ground, and another circuit will be completed from conductor 26 through conductor 36 and the contacts of the other switch P to conductor 31, which leads through the reversing-switch contacts of the windings of the motor M², and thence to ground. The two motors are therefore now connected in multiple, with the resistance $r^2$ in series therewith. Further movement of the master controlling-switch through the succeeding positions operates to reduce and to finally short-circuit the resistance in the motor-circuit, as before.

In the operation of electric-railway systems the potential between the trolley-conductor and ground is permitted to vary between considerable limits, and it is always likely to be abnormally reduced whenever a sudden and excessive demand is made on any one portion of the system. For this reason it is essential that in any control system of the character above described which is to be operated by current taken direct from the supply-conductors the electromagnets which operate the controller-switches shall be so constructed that they will operate successfully on one-half normal potential—that is, if the normal potential on the railway system is six hundred volts the switch-actuating electromagnets must be capable of operating successfully when the potential falls as low as three hundred volts. If, however, the electromagnets are so constructed that they will operate on substantially one-half normal potential, it will be found that the circuit connections when the reversing-switch fails to throw on one of a plurality of motor-cars are such that the circuit-controlling switches will be operated to close the motor-circuits on the car on which the reversing-switch has not been thrown when the master-controller is moved from its last series position toward the first parallel position, and it is for the purpose of preventing this operation of the circuit-controlling switches that my present invention is designed.

The particular portion of the control system to which my invention relates includes certain of the master-controller contacts and those conductors of the train system through which the reversing and series-parallel switches are controlled. Fig. 2 is a diagram illustrating this portion of the system, all of the motor-circuits and the motor-controller contacts being omitted from the diagram and only so much of the master controlling-switch being shown as is necessary for an understanding of the operation of my invention. The relative positions of the parts are the same as in Fig. 1 of the drawings; but the reversing-switch B of the master-controller is shown in a simplified form and the motor-reversing-switch cylinder RS, together with the auxiliary contacts mounted thereon, are shown developed on a plane surface. In tracing the circuits in Fig. 1 it was assumed that the reversing-switch of the master-controller occupied a position corresponding to the position of the motor-reversing switch, as shown in that figure. If, however, the master reversing-switch is placed in an opposite position, the circuits as traced from the master controlling-switch will be quite different. In order that the function of the auxiliary contacts on the reversing-switch may be understood, let it be supposed that the member $b$ of the reversing-switch B occupies the position shown in full lines in Fig. 2 of the drawings. Then when the master controlling-switch is moved into its first operative position, where the contacts $1'$ to $6'$, inclusive, lie along the line 1 1, a circuit may be traced from the trolley-conductor through the contacts $1'$ and $2'$ and the coöperating movable contacts $1^a$ and $2^a$ to conductor 2, thence through the reversing-switch lever to contact $13'$, and to conductor 13, one of the conductors of the system F. From this conductor on each motor-car of the train the circuit may be traced through the conductor $13''$ and through the winding of one of the reversing-switch-actuating magnets $D^2$ to contact $16'$, which in the particular position of the reversing-switch indicated is in engagement with a contact $16^a$. Another similar contact $17^a$, electrically connected with the contact $16^a$, is in engagement with a contact $17'$, through which the circuit is completed to conductor 17. A similar circuit is completed to conductor 20 when the reversing-switch is in its other operative position, as will be hereinafter more fully explained. From the junction of these two conductors 17 and 20 a conductor 21 leads to a ground connection; but the circuit through this conductor is closed only when the switches which operate to connect the motor-circuits to the source of supply are open. This results from the fact that the circuit through the conductor 21 leads through certain auxiliary contacts $21'$ $21'$, which are bridged by a conducting member $21^a$ only when the switches which operate to complete the motor-circuits are open. I have shown these auxiliary contacts operatively related to one of the trolley-switches $T'$, the member $21^a$ being carried by the movable switch member of the trolley-switch, as illustrated more in detail in Fig. 5. The circuit just traced having been completed at the master-controller contacts and all of the circuit-controlling switches of the motor-controller being in their open positions, the contact $21^a$ will be in engagement with the two fixed contacts $21'$, and the current flowing through the actuating-winding of the electromagnet $D^2$ will operate to move the reversing-switch cylinder into its other operative position, in which position the contacts $16^a$ and $17^a$ will have passed out of engagement with the corresponding fixed contacts $16'$ and $17'$, the contacts $19^a$ and $20^a$ will have come into engagement with the corresponding fixed contacts $19'$ and $20'$, and the contacts $16'$ and $18'$ will have been bridged by the movable contact $18^a$. The reversing-switch, therefore, in moving under the influence of the actuating-electromagnet $D^2$ opens the circuit direct to ground through contacts $16'$ $17'$ and conductor 17 and immediately thereafter reëstablishes a circuit from the contact $16'$ through contact $18^a$ to contact $18'$ and through the conductor 18 to one end of the actuating-winding of one of the trolley-switches. The remainder of this circuit may be traced, as already explained in connection with Fig. 1, through the actuating-windings of the two trolley-switches, the first resistance-switch, the series switch, and the auxiliary contacts controlled by one of the parallel switches to the conductor 4 and thence to ground through contacts of the master-controller. The features illustrated in this Fig. 2 of the drawings, apart from the auxiliary contacts controlled by the trolley-switch, belonged to the art which was already in existence at the time that my invention was made. If there is only one motor-car in the train, these auxiliary contacts will serve no useful function, since whenever the reversing-switch throws, the circuit direct to ground through the winding of the reversing-switch-actuating magnet is broken at the auxiliary contacts on the reversing-switch cylinder; but when there are two or more motor-cars in the train the circuit connections are such as may be productive of serious trouble in case the reversing-switch on one of the motor-cars is thrown into its proper position and the corresponding switch on another car or on other cars of the train is not thrown, due to broken connections or to defects in switch construction (or to any other cause) when the master-controller circuit is closed. The nature of the trouble may be appreciated from an inspection of Fig. 3 of the drawings, which figure is in general the same as Fig. 2, except that it illustrates the circuit connections for two motor-cars on a train or for two motor equipments in a motor-control system. In this figure, however, the actuating-windings for the resistance - controlling switches are omitted and the auxiliary contacts are shown by themselves without the reversing-switch cylinder on which they are mounted being indicated. The master controlling-switch is shown in its first operative position, and the position of the auxiliary contacts on car No. 1 is such as to indicate that this switch has been properly thrown by its actuating-electromagnet $D^2$. On car No. 2, however, the reversing-switch has not thrown and the circuit through the winding of the actuating-electromagnet $D^2$ is still completed to ground through contacts 16' and 17', the conductor 21, and the auxiliary contacts 21'. Because the reversing-switch on car No. 1 has thrown, the circuit to the actuating-windings of those controlling-switches which operate to make the series connection of the motor-circuits on that car is closed. The circuits through which current is flowing on the two cars are indicated by the full arrows, and by tracing these circuits it will be seen that current entering at the trolley-shoe T flows through the conductor 1, contacts 1' and 2' of the master controlling-switch, and contact 13' of the master reversing-switch to train-conductor 13, thence on car No. 1 the current flows through conductor 13'' and the actuating - winding of the electromagnet $D^2$ and through contacts 16' and 18' on the reversing-switch cylinder to one end of the actuating - winding of the trolley - switch T', thence the circuit leads through the actuating-windings of the trolley-switches, the first resistance-switch, and the series switch and through the auxiliary contacts controlled by one of the parallel switches to the conductor 4'', which is connected to train-conductor 4, and thence to ground through contacts 4' and 3' of the master controlling-switch. On the other car of the train the current flows only through conductor 13'', the winding of the actuating-magnet $D^2$, contacts 16' and 17', conductor 21, and contacts 21' to ground. All of the controlling-switches on this second car remain, therefore, in their open-circuit positions. Before going further in the explanation it is necessary to state that the auxiliary contacts controlled by the switch S and by the switch P are safety devices, which are introduced for the purpose of preventing a circuit from being closed through the actuating-windings of those switches which complete the parallel connections of the motors until after the series connection has been broken, and vice versa. The arrangement of these contacts constitutes no part of my invention in the present application; but it is one of the features which is described and claimed in my prior application, Serial No. 671,994, filed February 28, 1898. Now, tracing the circuit indicated by the dotted arrows, it will be found that from the point $y$, where the conductor 4'' joins the conductor 4, a second branch circuit leads to the right through train-conductor 4 to conductor 4'' on the next succeeding car, thence back through the safety-contacts on the switch P, and through the actuating-windings of the switches S R' T' T' to the conductor 18, and through contacts 18' and 19' on the reversing - switch cylinder to the winding of the electromagnet D', and thence through conductor 12'' to conductor 12 of the train system, through the said conductor back to car No. 1, and down through conductor 12'' on car No. 1 and through the actuating-winding of the electromagnet D' on that car to contacts 19' and 20', and thence to ground through conductor 21, provided no auxiliary contacts 21' 21' are employed. If, then, these auxiliary contacts, which constitute my present invention, were omitted and if the reversing-switch on one of the cars should fail to throw, the operation when the master-controller is in any of the series positions from 1' to $5^5$, inclusive, would be entirely satisfactory, except that the propelling-motors on the particular car on which the reversing-switch had failed to throw would be doing no work. When, however, the master controlling-switch is moved from its last series position toward the first multiple position, the direct circuit to ground through conductor 4 and contacts 3' and 2' (indicated by the full arrows) is broken, and since at this time another circuit exists through the actuating-windings of the switches T' T', R', and S on car No. 1 and in a reverse direction through the corresponding windings on car No. 2 and back through the other actuating-windings of each of these reversing-switches to ground the switches on the second car would be caused to operate immediately as soon as the circuit was broken at the contacts $3^a$ and $4^a$ on the master-controller. This would mean that the circuits through the motors on car No. 2 would be completed under such conditions that these motors would tend to operate as generators in opposition to all of the other propelling - motors on the train and would take such excessive current that the train would be brought to a sudden stop or possibly be broken in two by the shock, and at any rate the fuses in the motor-circuits on car No. 2 would be blown. By the addition of the auxiliary contacts constituting my present invention the circuit above traced cannot be complete, because the ground connection for the reversing-switch-actuating windings on any one car is opened whenever the reversing-switch on that car has been thrown into such a position that the circuit-controlling switches will be operated, and therefore whether or not the reversing-switches on the several cars operate successfully to complete the motor-circuits for rotation in the direction corresponding to the position into which the master reversing-switch has been thrown no trouble can occur in any position of the master-controller, and the system will operate satisfactorily, except that the motors on any car on which the reversing-switch has failed to throw will not be supplied with current.

What I claim as new, and desire to secure by Letters Patent of the United States, is—

1. In a motor-control system, a plurality of motor-controllers, electromagnetic means for operating each of said controllers, a common set of conductors to which said electromagnetic means are connected in parallel, a master-controller constructed and arranged to connect said conductors to a suitable source of current-supply, and means for preventing the closing of a circuit through the electromagnetic actuating means of the two controllers in series.

2. In a motor-control system, a plurality of motor-controllers each comprising separate reversing and circuit-controlling switches, electromagnetic means for operating said switches, a system of conductors to which said electromagnetic means are connected in multiple, a master-controller constructed and arranged to connect said system of conductors to a suitable source of current-supply, and means for preventing the operation of the circuit-controlling switches of any controller in which the reversing-switch fails to throw.

3. In combination, a plurality of controllers each comprising a plurality of sets of contacts, electromagnetic means for operating the contacts of each controller, a system of conductors to which said electromagnetic means are connected in multiple, a master-controller constructed and arranged to connect said system of conductors to a suitable source of current-supply, and means in each controller for preventing the operation of the contacts of one set until after the contacts of the other set have been operated.

4. In a motor-control system, a plurality of motor-controllers each comprising reversing and circuit-controlling switches, electromagnets for operating said switches, a common set of conductors to which said electromagnets are connected in multiple, a master-controller constructed and arranged to connect said conductors to a suitable source of current-supply, auxiliary contacts operatively related to each reversing-switch constructed and arranged to complete the circuit of one of the reversing-switch-actuating magnets directly to one side of the source of supply and to connect the other reversing-switch-actuating magnet in the actuating-circuit for the circuit-controlling switches of the controller, and other auxiliary contacts operatively related to one of the circuit-controlling switches included in the direct circuit from the reversing-switch-actuating magnet to one side of the source of supply.

5. In a motor-control system, a plurality of motor-controllers each comprising circuit-controlling switches and a separate reversing-switch, actuating-windings for the circuit-controlling switches connected in a series branching at one end to include two distinct sets of windings, separate actuating-windings for the reversing-switch, conductors to which one end of each of the reversing-switch-actuating windings and the two branching ends of the series of controlling-switch-actuating windings are connected, a master-controller constructed and arranged to connect said conductor to a suitable source of current-supply, auxiliary contacts operatively related to the reversing-switch of each controller constructed and arranged to connect one of the reversing-switch-actuating windings directly to one side of the source of supply and to connect the other reversing-switch-actuating winding in the actuating-circuit for the circuit-controlling switches of the controller, and other auxiliary contacts operatively related to one of the circuit-controlling switches included in the circuit from the reversing-switch-actuating winding directly to one side of the source of supply.

In witness whereof I have hereunto set my hand this 2d day of January, 1902.

FRANK E. CASE.

Witnesses:
BENJAMIN B. HULL,
MARGARET E. WOOLLEY.